United States Patent [19]
Asberg

[11] 3,952,820
[45] Apr. 27, 1976

[54] HUB DEVICE FOR A WHEEL OF A ROAD VEHICLE

[75] Inventor: Sture Lennart Asberg, Partille, Sweden

[73] Assignee: SKF Nova A.B., Goteborg, Sweden

[22] Filed: Dec. 3, 1973

[21] Appl. No.: 420,807

[30] Foreign Application Priority Data
Dec. 8, 1972 Sweden............................ 16001/72
Dec. 8, 1972 Sweden............................ 16000/72

[52] U.S. Cl............................. 180/1 R; 301/6 CS; 188/264 AA; 188/18 A
[51] Int. Cl.²............................................ B60T 5/00
[58] Field of Search................... 280/80, 96.2, 96.3; 180/43 R, 48; 188/18 A, 264 A, 264 AA; 301/6 R, 6 CS

[56] References Cited
UNITED STATES PATENTS

| | | | |
|---|---|---|---|
| 2,037,982 | 4/1936 | Hughes ............................ | 301/6 R |
| 2,499,684 | 3/1950 | Sanmori........................ | 188/18 A X |
| 3,051,271 | 8/1962 | Spannagel et al................. | 188/18 A |
| 3,059,730 | 10/1962 | Nickell et al. .............. | 188/264 A X |
| 3,217,844 | 11/1965 | Nelson et al................. | 188/264 AA |
| 3,295,626 | 1/1967 | Cadiou.................................. | 180/48 |
| 3,351,157 | 11/1967 | Claveau............................ | 188/18 A |
| 3,583,511 | 6/1971 | Asberg............................... | 180/43 R |

FOREIGN PATENTS OR APPLICATIONS

| | | | |
|---|---|---|---|
| 1,107,096 | 5/1961 | Germany ........................ | 188/264 A |
| 586,494 | 1/1925 | France .............................. | 301/6 CS |

*Primary Examiner*—Kenneth H. Betts
*Attorney, Agent, or Firm*—Daniel M. Rosen

[57] ABSTRACT

A wheel and bearing unit for a vehicle comprising inner and outer rings in between which two rows of rolling bodies and sealing means are applied. The outer or inner ring is connected to a member of a brake device while the inner forms a connecting means for the wheel and a shaft. The unit is characterized in that the wheel is mainly a conical shaped disc one side of which is smooth while the other side is provided with connecting means for connecting the disc to the bearing inner ring and brake device parts. The disc is further provided with air cooling apertures having edges which can lead cooling air streams mainly in the direction of the brake device.

19 Claims, 6 Drawing Figures

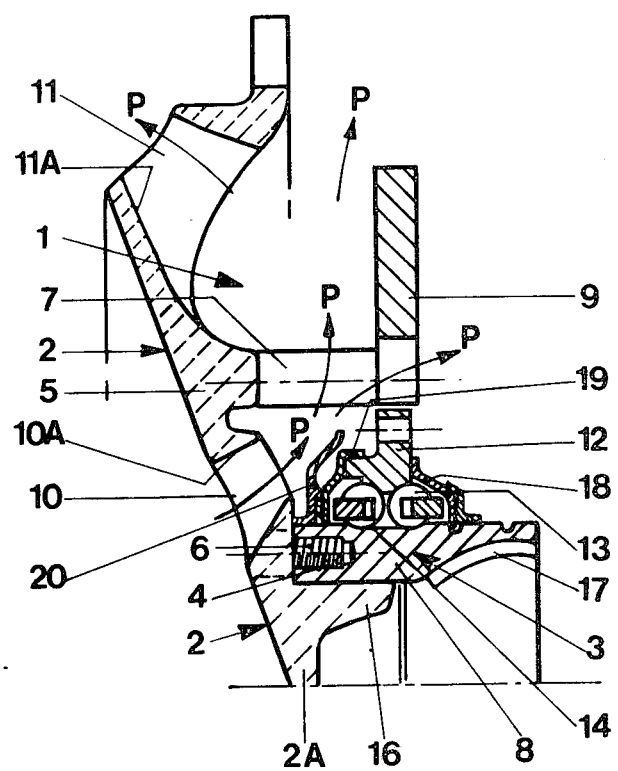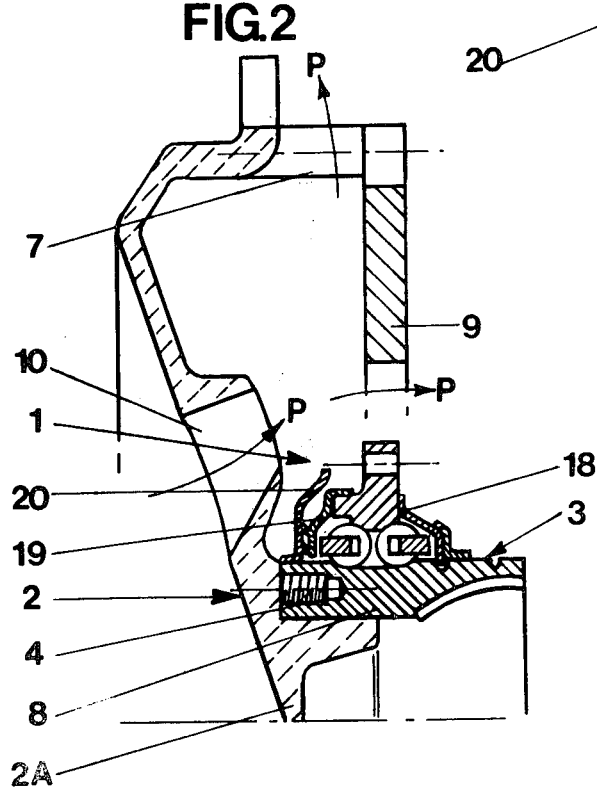

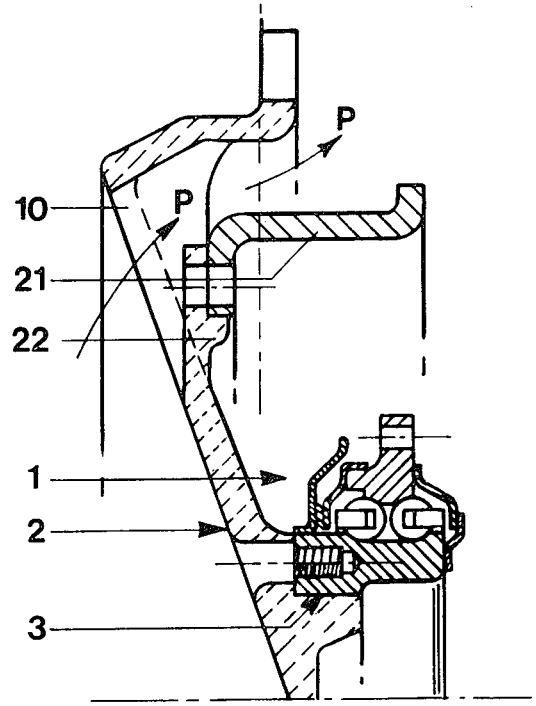
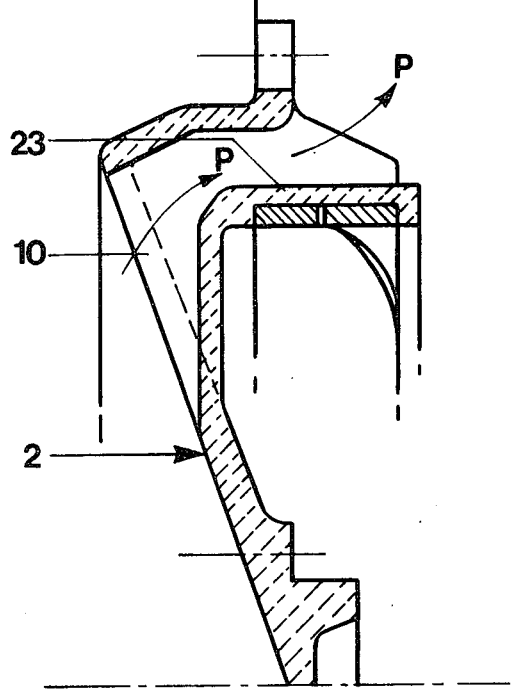

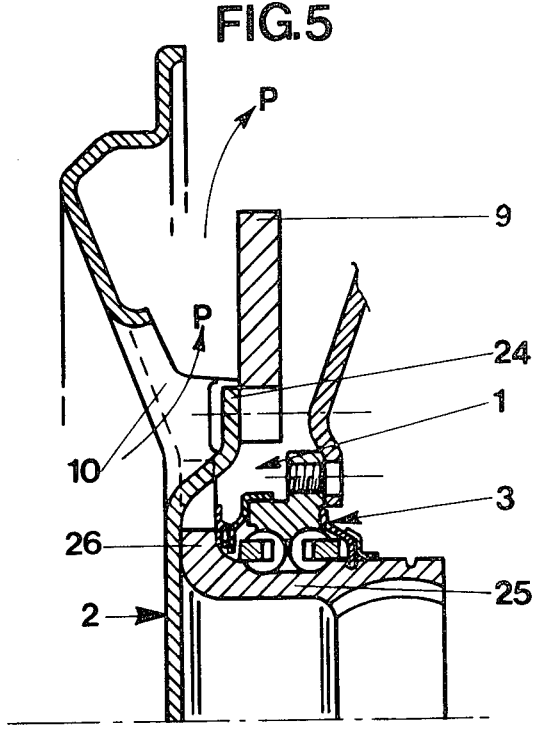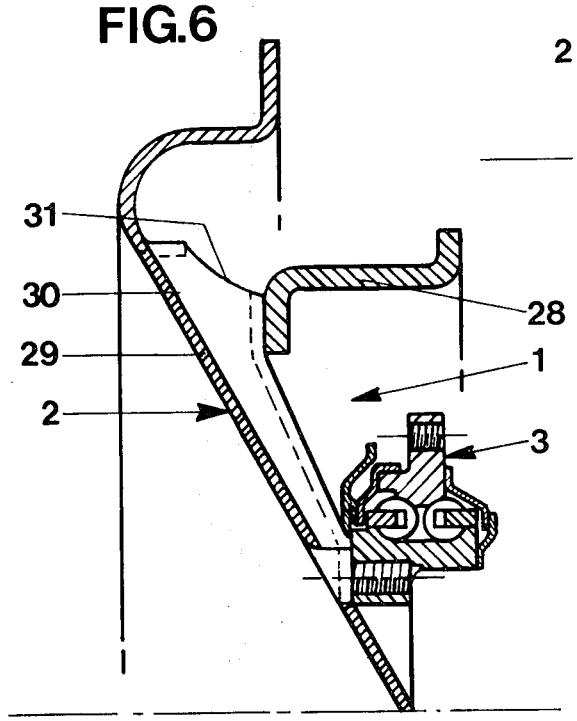

HUB DEVICE FOR A WHEEL OF A ROAD VEHICLE

This invention relates to a wheel and bearing unit for a vehicle comprising a roller bearing including an inner and outer ring in between which two rows of rolling bodies and sealing means are applied, the outer or inner ring being connected to a member of a brake device, while the inner ring forms a connecting means for the wheel and a shaft. Such a unit is described for example in the United States Patent specification No. 3,583,511.

The object of the invention is to produce a simple, light and yet strong wheel and bearing unit of hub bearing unit construction, such as disclosed in U.S. Pat. No. 3,583,511, Asberg, and which has an attractive appearance for the vehicle and moreover to improve the cooling of the brake device which forms a part of the unit. According to the invention the wheel is a mainly conical shaped disc one side of which is smooth and the other side of which is provided with connecting means for connecting the disc to the bearing inner ring and brake device parts and further provided with air cooling apertures having edges which can lead cooling air streams mainly in the direction of the brake device.

The German Pat. application No. 1107096 describes a wheel construction which, apart from the fact that the bearing unit is completely different in construction as compared with the bearing unit according to the invention, also is provided with air cooling apertures for the brake device. These apertures, however, are formed in a complicated shaped wheel and also wheel-cap. Therefore it can be expected that for instance an incorrect position between cap and wheel will result in a low cooling effect in the unit.

According to a preferable embodiment of the invention the edges of the air cooling apertures are conical or nozzle-like shaped. By this a large and concentrated amount of cooling air streams to the brake device and bearing unit during rotation are generated.

The foregoing object and brief description of the present invention will become more apparent from the following more detailed description and appended drawings, wherein:

FIG. 1 shows a wheel hub and bearing unit;

FIG. 2 is a variation of FIG. 1;

FIG. 3 is a further embodiment of a wheel and bearing unit;

FIG. 4 is a further embodiment of a wheel and bearing unit for a non-driven wheel;

FIG. 5 is an embodiment of a wheel and bearing unit showing a pressed sheet disc; and, FIG. 6 is a variant of FIG. 5 for a brake drum.

According to FIG. 1 the wheel and hub bearing unit 1 mainly consist of a conical, outwardly open disc-like wheel 2 and a hub bearing unit 3. The wheel 2 is provided with connecting means 4 and 5 in the form of a threaded or smooth bores in which connecting parts 6 and 7 of a bearing member 8 and a brake disc 9 respectively is screwed. The wheel member 2 is provided with apertures 10 and 11, through which an air stream for cooling the brake disc 9 and the bearing 3 is effected. The apertures 10 and 11 are executed as a nozzle. An aperture is provided with conical ring-edges 10A and 11A which respectively converge and diverge from the direction of the brake disc 9 and the bearing unit 3. By this arrangement a simple and effective air cooling effect in the unit is obtained. The wheel member 2 shown in FIGS. 1 and 2 is provided with projections 7, to which a brake disc 9 is secured. By this kind of mounting the brake disc 9 can be simply designed and in addition easily mounted and dismounted. The bearing unit 3 comprises an inner ring 8, an outer ring 12 and therebetween rolling bodies 13. The inner ring 8 includes integrated races 14 for the rolling bodies 13. Instead of one inner ring 8 also separate inner rings can be applied. The bearing member 8 fits on an annular shoulder 16 forming a part of the cone or taper 2A of the disc-like wheel 2 and is fastened thereon by screws (not shown). At its other end, the hub bearing 3 is provided with a drive member or shaft 17, by which the driving of the wheel 2 is effected. The drive member 17 need not to be integrated with the bearing member, but may be fixed thereon by a screw connection, by welding or in another way. The hub bearing 3 as shown is intended for applying in a wheel connected to the driving shaft of the vehicle. The wheel 2 is light weight but yet strong, and preferably made of pressed cast aluminium, pressed sheet metal or the like. By designing the wheel member 2 in the way described above and of the material indicated, very good fastening possibilities for the brake member 9 and the bearing unit 3 are obtained. Due to the material choice, the bearing 3 can have a large diameter, which is very suitable especially regarding the function of the unit. The bearing 3 further is protected against entering impurities by sealing means 18, 19 and a dust cap 20. The caliper house (not shown) comprising the brake controlling means will embrace according to FIG. 1 the brake disc 9 from its open outside end. During rotation of disc-wheel 2 an air stream, indicated by arrows P, is generated in a large amount by the conical or nozzle-like apertures 10. This air stream then flows along the brake device 9 and bearing 3, cooling down the temperature of these parts and flows at a certain speed out of the apertures 11 as well.

FIG. 2 shows a variant of the wheel and bearing unit, which differs from the above described unit in that the brake disc 9 is now attached to the upper portion of the wheel member 2. This arrangement provides the advantage that the control means of the brakesystem can be placed more centrally in relation to the center of the unit, so that torsional forces or moments will have less influence on the function of the unit.

FIG. 3 shows another embodiment of a wheel and bearing unit at which the brake device now consist of a brake drum 21, which is attached to the disc-wheel member 2 at an annular stop member 22 forming a part of the leading edge of the aperture 10.

FIG. 4 also shows an embodiment of a wheel and bearing unit comprising a brake drum 23, which in this case forms an integrated part of the disc-wheel 2. This embodiment is more suitable for a non driven vehicle wheel.

FIGS. 5 and 6 shows embodiments of wheel and bearing units according to the invention which are similar to those described above, and of which the disc-wheel member 2 is made of pressed sheet metal. According to FIG. 5 the brake disc 9 is attached to the wheel member 2 at an annular shoulder 24 of the aperture 10. In this embodiment the inner ring 25 of the bearing unit 3 now is elongated to a flange like element 26 on which the wheel 2 is connected. According to FIG. 6 which shows similar attachment arrangements now instead of a brake disc a drum 28 of a brake drum device is applied. The drum 28 is attached to the nozzle-like cooling aperture 29 the intake 30 of which is several times larger than its exhaust 31.

In all the embodiments described above, the bearing is shown as a bearing with rotating inner ring, however, a bearing with a rotating outer ring can also be applied.

The invention is, however, not restricted to the embodiments described above, but can be varied in several ways within the scope of the invention.

I claim:

1. A wheel and a bearing structure for a vehicle, comprising a roller bearing having an inner ring, an outer ring, two rows of rolling bodies between said inner and outer rings, and sealing means for said rolling bodies, a wheel disc affixed coaxially to one of said rings and having a smooth surface away from said one ring, said wheel disc extending conical outward with the outer edge of the disc being spaced laterally away from said one ring, a brake device affixed coaxially to the side of said wheel disc opposite said smooth surface, said disc having air cooling apertures with edges positioned to direct cooling air streams through said wheel disc and against said brake device.

2. The structure of claim 1, wherein said air cooling apertures are conical or nozzle-like in shape.

3. The structure of claim 1, wherein each of said apertures is nozzle-like with an intake larger than its exhaust.

4. The structure of claim 1, wherein connecting means are provided adjacent a leading edge of at least some of said apertures for affixing a portion of said brake device to said wheel disc.

5. The structure of claim 1, wherein said brake device comprises a brake drum, said drum being integrated with said wheel.

6. The structure of claim 5, wherein said drum of said brake device is connected to a leading edge of at least one of said apertures.

7. The structure of claim 5, wherein said drum forms an integrated part of a leading edge of at least one of said apertures of said wheel.

8. The structure of claim 5, wherein said brake device comprises a brake disc, said brake disc being axially spaced apart from said wheel disc, whereby a space is provided between said wheel disc and said brake disc, said apertures being positioned to direct a cooling air stream into said space and in a radial direction along said brake disc.

9. The structure of claim 8, wherein said brake disc is connected to a leading edge of at least one of said air cooling apertures of said wheel.

10. The structure of claim 8, wherein said brake disc is connected to the outside part of said wheel, adjacent said outer edge of said wheel disc.

11. The structure of claim 8, wherein said brake disc is affixed to said wheel disc at a given radial position on said wheel disc, at least some of said apertures extending through said wheel disc radially inwardly of the portion at which said brake disc is affixed.

12. The structure of claim 11, wherein the radially inner edge of said brake disc is affixed to said wheel disc, and at least one of said apertures extends through said wheel disc radially outwardly of said portion of connection of said brake disc to said wheel disc.

13. The structure of claim 12, wherein said apertures radially inwardly and radially outwardly of said portion are conical.

14. The structure of claim 11, wherein the radially outer edge of said brake disc is affixed to said wheel disc.

15. The structure of claim 1, wherein said wheel disc is affixed to said inner ring.

16. The structure of claim 15, wherein said inner ring comprises means for coupling said inner ring to a drive shaft, whereby said inner ring forms a connecting means between said wheel shaft disc and a drive shaft.

17. The structure of claim 1, wherein said wheel disc is of a light cast metal.

18. The structure of claim 17, wherein said wheel disc is of cast aluminum.

19. The structure of claim 1, wherein said wheel disc is of pressed sheet steel.

* * * * *

UNITED STATES PATENT AND TRADEMARK OFFICE
CERTIFICATE OF CORRECTION

PATENT NO. : 3,952,820
DATED : April 27, 1976
INVENTOR(S) : Sture Lennart Asberg It is certified that error appears in the above-identified patent and that said Letters Patent are hereby corrected as shown below:

Column 3, line 18 change "conical" to --conically--.

Column 4, line 35 omit "shaft" first occurrence.

Signed and Sealed this

Second Day of May 1978

[SEAL]

Attest:

RUTH C. MASON
Attesting Officer

LUTRELLE F. PARKER
Acting Commissioner of Patents and Trademarks